United States Patent
Van Phan et al.

(10) Patent No.: US 10,362,580 B2
(45) Date of Patent: Jul. 23, 2019

(54) FAIR RESOURCE SHARING IN BROADCAST BASED D2D COMMUNICATIONS

(71) Applicant: Nokia Technologies OY, Espoo (FI)

(72) Inventors: Vinh Van Phan, Oulu (FI); Ling Yu, Espoo (FI); Kodo Shu, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/106,045

(22) PCT Filed: Dec. 18, 2013

(86) PCT No.: PCT/CN2013/089766
§ 371 (c)(1),
(2) Date: Jun. 17, 2016

(87) PCT Pub. No.: WO2015/089751
PCT Pub. Date: Jun. 25, 2015

(65) Prior Publication Data
US 2017/0006611 A1  Jan. 5, 2017

(51) Int. Cl.
*H04W 4/70* (2018.01)
*H04W 72/04* (2009.01)
(Continued)

(52) U.S. Cl.
CPC ......... *H04W 72/0486* (2013.01); *H04W 4/06* (2013.01); *H04W 72/005* (2013.01); *H04W 72/042* (2013.01); *H04W 76/14* (2018.02)

(58) Field of Classification Search
CPC .............................. H04W 4/70; H04W 72/04
See application file for complete search history.

(56) References Cited

U.S. PATENT DOCUMENTS

| | | | |
|---|---|---|---|
| 2002/0138643 A1* | 9/2002 | Shin | H04L 47/10 709/232 |
| 2007/0143251 A1* | 6/2007 | Brooks | G06F 16/13 |

(Continued)

FOREIGN PATENT DOCUMENTS

| | | |
|---|---|---|
| CN | 102246575 A | 11/2011 |
| CN | 102547871 A | 7/2012 |

(Continued)

OTHER PUBLICATIONS

"Agreements from TSG RAN on Work on Public Safety Related Use Cases in Release 12", TSG-RAN meeting #61, RP-13177, Agenda: 13.1, Vodafone, Sep. 3-6, 2013, pp. 1-6.

(Continued)

*Primary Examiner* — Ayanah S George
(74) *Attorney, Agent, or Firm* — Squire Patton Boggs (US) LLP

(57) ABSTRACT

Systems, methods, apparatuses, and computer program products for fair resource sharing among user(s) or user groups in broadcast based D2D communications are provided. One method includes monitoring, by a cluster head, at least one user group sharing physical channel resources. The at least one user group may include at least one D2D user equipment. The method may further include calculating a current share of the physical channel resources for the at least one user group based on pre-configured fair sharing rules, determining when a maximum fair share of the physical channel resources are allocated to one of the at least one user group, determining whether remaining physical resources are sufficient. When the remaining physical resources are sufficient, the method may include issuing an indication to the one of the at least one user group. When the remaining physical resources are not sufficient, the method (Continued)

may include issuing a warning to the one of the at least one user group.

19 Claims, 3 Drawing Sheets

(51) Int. Cl.
*H04W 72/00* (2009.01)
*H04W 4/06* (2009.01)
*H04W 76/14* (2018.01)

(56) References Cited

U.S. PATENT DOCUMENTS

| | | | |
|---|---|---|---|
| 2009/0077251 A1* | 3/2009 | Brown | H04L 67/16 709/230 |
| 2009/0077257 A1* | 3/2009 | Savoor | H04L 41/0681 709/232 |
| 2012/0030358 A1* | 2/2012 | MacKenzie | H04W 52/0219 709/226 |
| 2012/0155400 A1* | 6/2012 | Zhang | H04W 74/002 370/329 |
| 2012/0155406 A1* | 6/2012 | Kim | H04W 4/70 370/329 |
| 2014/0254356 A1* | 9/2014 | Jeong | H04L 47/20 370/229 |

FOREIGN PATENT DOCUMENTS

| | | | |
|---|---|---|---|
| WO | 2010/049801 A1 | 5/2010 | |
| WO | 2012/011335 A1 | 1/2012 | |
| WO | 2012/013355 A1 | 2/2012 | |
| WO | 2013156056 A1 | 4/2012 | |
| WO | 2012104644 A1 | 8/2012 | |
| WO | 2012159270 A1 | 11/2012 | |
| WO | WO 2012159270 A1 * | 11/2012 | H04W 72/048 |
| WO | WO-2012159270 A1 * | 11/2012 | H04W 72/048 |
| WO | 2013/131264 A1 | 9/2013 | |
| WO | 2013/139041 A1 | 9/2013 | |
| WO | 2013/141600 A1 | 9/2013 | |

OTHER PUBLICATIONS

"Discussion on Need of Identity and Group Management on L2/L3", 3GPP TSG-RAN Working Group 2 meeting #84, R2-134343, Agenda: 7.5.3.2, Nokia Corporation, Nov. 11-15, 2013, 3 pages.
"Typical Public Safety Use Cases, Performance Values, and E-UTRAN Characteristics for D2D ProSe Group Communication", 3GPP TSG-RAN Working Group 2 meeting #83, R2-132322, Agenda: 7.5.1, 7.5.2, U.S. Department of Commerce, Aug. 19-23, 2013, 5 pages.
"Prioritization Mechanism for ProSe Communication", 3GPP TSG-RAN Working Group 2 meeting #90, R2-152120, Agenda: 7.5.4, Panasonic, May 25-29, 2015, pp. 1-3.
"Group Priority Handling", 3GPP TSG-RAN Working Group 2 meeting #90, R2-152150, Agenda: 7.5.4, Samsung, May 25-29, 2015, pp. 1-3.
"Priority Handling for ProSe", 3GPP TSG-RAN Working Group 2 meeting #90, R2-152168, Agenda: 7.5.4, Intel Corporation, May 25-29, 2015, pp. 1-2.
"Priority Handling for D2D Communication", 3GPP TSG-RAN Working Group 2 meeting #90, R2-152322, Agenda: 7.5.4, CATT, May 25-29, 2015, pp. 1-3.
"ProSe User and Group Priority", 3GPP TSG-RAN Working Group 2 meeting #90, R2-152403, Agenda: 7.5.4, Ericsson, May 25-29, 2015, pp. 1-4.
"Clarification on Priority Handling in RRC/MAC", 3GPP TSG-RAN Working Group 2 meeting #90, R2-152421, Agenda: 7.5.4, ETRI, May 25-29, 2015, pp. 1-3.
"Resource Pool Handling for Priority Support", 3GPP TSG-RAN Working Group 2 meeting #90, R2-152422, Agenda: 7.5.4, ETRI, May 25-29, 2015, pp. 1-2.
"Priorities for ProSe Communication", 3GPP TSG-RAN Working Group 2 meeting #90, R2-152558, Agenda: 7.5.4, ZTE Corporation, May 25-29, 2015, 2 pages.
"Priority Handling for Sidelink Direct Communication", 3GPP TSG-RAN Working Group 2 meeting #90, R2-152575, Agenda: 7.5.4, Qualcomm Incorporated, May 25-29, 2015, 2 pages.
"ProSe RAN Functional Description for Realizing Off-Network MCPTT Priority", 3GPP TSG-RAN Working Group 2 meeting #90, R2-152669, Agenda: 7.5.4, U.S. Department of Commerce, May 25-29, 2015, 6 pages.
"Sidelink Access Stratum Layer Priority Handling", 3GPP TSG-RAN Working Group 2 meeting #90, R2-152676, Agenda: 7.5.4, Sharp, May 25-29, 2015, pp. 1-3.
"Group Priorities for ProSe Communications", 3GPP TSG-RAN Working Group 2 meeting #90, R2-152678, Agenda: 7.5.4, InterDigital Communications, May 25-29, 2015, pp. 1-6.
"On ProSe Discovery for Inter-Carrier and Inter-PLMN", 3GPP TSG-RAN Working Group 2 meeting #90, R2-152682, Agenda: 7.5.4, InterDigital Communications, May 25-29, 2015, pp. 1-3.
"RAN2 Impact of ProSe Priorities", 3GPP TSG-RAN Working Group 2 meeting #90, R2-152760, Agenda: 7.5.4, Huawei, May 25-29, 2015, pp. 1-5.
"Support MCPTT Private Call with ProSe", 3GPP TSG-RAN 2 meeting #90, R2-152197, Agenda: 7.5.5, ITRI, May 25-29, 2015, 2 pages.
"Floor Control and Pre-Emption for ProSe", 3GPP TSG-RAN Working Group 2 meeting #90, R2-152393, Agenda: 7.5.5, Ericsson, May 25-29, 2015, pp. 1-4.
"3rd Generation Partnership Project; Technical Specification Group Services and System Aspects; Vocabulary for 3GPP Specifications (Release 12)", 3GPP TR 21.905, V12.0.0, Jun. 2013, pp. 1-64.
Rawat et al., "Dynamic Adaptation of Joint Transmission Power and Contention Window in VANET", IEEE 70th Vehicular Technology Conference Fall, 2009, 5 pages.
Extended European Search Report received for corresponding European Patent Application No. 13899440.5, dated Jul. 17, 2017, 7 pages.
International Search Report and Written Opinion received for corresponding Patent Cooperation Treaty Application No. PCT/CN2013/089766, dated Sep. 17, 2014, 12 pages.
ZTE Study on D2D Resource Allocation 3GPP TSG-RAN-WG1 Meeting #75 Nov. 15, 2013 (Nov. 15, 2013) R1-135370 chapters 2 and 3.
Fujitsu Cluster-based unified approach to D2D direct communication 2GPP TSG-RAN1 #7423 Aug. 2013 (Aug. 23, 2013) R1-133140 whole document.
Chinese Office Action issued in corresponding Chinese Patent Application No. 201380081732.1 dated Oct. 29, 2018.
European Office Action issued in corresponding European Patent Application No. 13 899 440.5-1215 dated Jan. 15, 2019.

* cited by examiner

FAIR RESOURCE SHARING IN BROADCAST BASED D2D COMMUNICATIONS

RELATED APPLICATION

This application was originally filed as Patent Cooperation Treaty Application No. PCT/CN2013/089766 filed Dec. 18, 2013.

BACKGROUND

Field

Certain embodiments generally relate to communication systems, and for example, to device-to-device (D2D) communication integrated into a communications network, such as long-term evolution (LTE) or long-term evolution advanced (LTE-A) cellular network specified by the 3rd Generation Partnership Project (3GPP).

Description of the Related Art

Two types of communication networks include cellular networks and ad-hoc networks. A cellular network is a radio network made up of one or more cells, where each cell is served by at least one centralized controller, such as a base station (BS), a Node B, or an evolved Node B (eNB). In a cellular network, a user equipment (UE) communicates with another UE via the centralized controller, where the centralized controller relays messages sent by a first UE to a second UE, and visa-versa. In contrast, in an ad-hoc network, a UE directly communicates with another UE, without the need of a centralized controller. Utilizing a cellular network versus an ad-hoc network has its benefits and drawbacks. For example, utilizing a cellular network over an ad-hoc network provides the benefit of easy physical resource control and interference control. However, utilizing a cellular network over an ad-hoc network also provides the drawback of inefficient physical resource utilization. For instance, additional physical resources may be required in a cellular network when the two UEs are close to each other, as compared to an ad-hoc network.

A hybrid network utilizes both a cellular mode and a D2D transmission mode. In a hybrid network, a UE may choose to communicate either via a cellular mode or a D2D transmission mode. As an example, a hybrid network may allow UEs to communicate either via a cellular mode (i.e. via a centralized controller) or via an autonomous D2D transmission mode where the UEs may establish a channel without the need for a centralized controller. The UE may make this selection depending on which mode provides better overall performance. Thus, a hybrid network may improve total system performance over a cellular network or an ad-hoc network. However, in order to utilize a hybrid network, issues related to physical resource sharing and interference situations may need to be addressed.

In addition, proximity services (ProSe)/D2D discovery and communication is one of the ongoing study items for 3GPP Release 12 (Rel-12) standardization (as well as Release 13 and beyond). D2D scenarios that are currently being studied in 3GPP include D2D in network coverage, out of network coverage, and partial network coverage scenarios. For example, Public Safety (PS) 1-to-Multiple (1:M) D2D group communication in both out-of-coverage and in-coverage scenarios are a particular focus due to the potential public safety applications.

SUMMARY

One embodiment is directed to a method including monitoring, by a cluster head, at least one user group sharing physical channel resources. The at least one user group comprises at least one D2D user equipment. The method may further include calculating a current share of the physical channel resources allocated to the at least one user group based on pre-configured fair sharing rules, determining when a maximum fair share of the physical channel resources are allocated to one of the at least one user group, determining whether remaining physical resources are sufficient. The method may then include, when the remaining physical resources are sufficient, issuing an indication to the one of the at least one user group, and when the remaining physical resources are not sufficient, issuing a warning to the one of the at least one user group.

Another embodiment is directed to an apparatus including at least one processor and at least one memory comprising computer program code. The at least one memory and the computer program code are configured, with the at least one processor, to cause the apparatus at least to monitor at least one user group sharing physical channel resources. The at least one user group comprises at least one D2D user equipment. The apparatus may be further caused to calculate a current share of the physical channel resources allocated to the at least one user group based on pre-configured fair sharing rules, determine when a maximum fair share of the physical channel resources are allocated to one of the at least one user group, determine whether remaining physical resources are sufficient, issue an indication to the one of the at least one user group when the remaining physical resources are sufficient, and issue a warning to the one of the at least one user group when the remaining physical resources are not sufficient.

Another embodiment is directed to a computer program embodied on a computer readable medium. The computer program may be configured, when run a processor, to cause the processor to perform a process including monitoring at least one user group sharing physical channel resources. The at least one user group comprises at least one D2D user equipment. The process may further include calculating a current share of the physical channel resources allocated to the at least one user group based on pre-configured fair sharing rules, determining when a maximum fair share of the physical channel resources are allocated to one of the at least one user group, determining whether remaining physical resources are sufficient. The process may then include, when the remaining physical resources are sufficient, issuing an indication to the one of the at least one user group, and when the remaining physical resources are not sufficient, issuing a warning to the one of the at least one user group.

Another embodiment may be directed to an apparatus including means for monitoring at least one user group sharing physical channel resources. The at least one user group comprises at least one D2D user equipment. The apparatus may further include means for calculating a current share of the physical channel resources allocated to the at least one user group based on pre-configured fair sharing rules, means for determining when a maximum fair share of the physical channel resources are allocated to one of the at least one user group, means for determining whether remaining physical resources are sufficient. The apparatus may then include, when the remaining physical resources are sufficient, means for issuing an indication to the one of the at least one user group, and when the remaining physical resources are not sufficient, means for issuing a warning to the one of the at least one user group.

Another embodiment is directed to a method including monitoring, by a cluster member, control information for an indication or a warning message. The method may then include making a decision of when to attempt to request resources based on the monitored control information.

Another embodiment is directed to an apparatus including at least one processor and at least one memory comprising computer program code. The at least one memory and the computer program code are configured, with the at least one processor, to cause the apparatus at least to monitor control information for an indication or a warning message and to make a decision of when to attempt to request resources based on the monitored control information.

Another embodiment is directed to a computer program embodied on a computer readable medium. The computer program may be configured, when run a processor, to cause the processor to perform a process including monitoring control information for an indication or a warning message, and making a decision of when to attempt to request resources based on the monitored control information.

Another embodiment may be directed to an apparatus including means for monitoring control information for an indication or a warning message, and means for making a decision of when to attempt to request resources based on the monitored control information.

BRIEF DESCRIPTION OF THE DRAWINGS

For proper understanding of the invention, reference should be made to the accompanying drawings, wherein.

DETAILED DESCRIPTION

Figure 1:
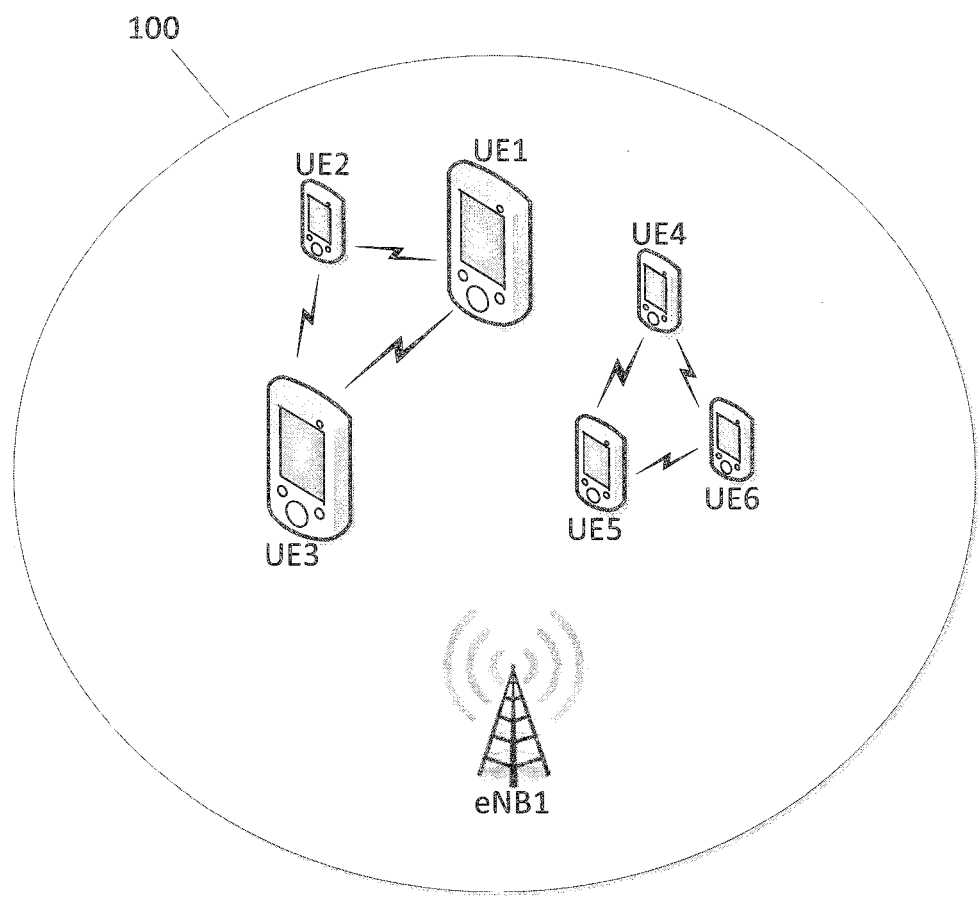
FIG. 1 illustrates a system according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products for fair resource sharing among user(s) or user groups in broadcast based 1:M D2D communications, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments of the invention are applicable to LTE-A, including 3GPP LTE-A Rel-12, Rel-13 and beyond, which addresses LTE-A supports for network-controlled D2D discovery. The 3GPP has begun carrying out a study for potential services and requirements for D2D communications, referred to as Proximity Services (ProSe). One objective of this study is to look at use cases and identify potential requirements for an operator network controlled discovery and communications between devices that are in proximity, under continuous network control, and/or are under 3GPP network coverage. This could be for the purposes of commercial/social use, network offloading, public safety, and/or integration of current infrastructure services to assure the consistency of the user experience including reachability and mobility aspects.

The latest RAN plenary outcomes include certain agreements on prioritized standardization items for LTE ProSe D2D communications. The outcomes of RAN1#74 include, for PHY broadcast, which is used for unicast and group-cast as well, the baseline is no PHY close-loop feedback, i.e., hybrid automatic repeat request (HARQ), power control etc. For higher layers, unicast, group-cast and broadcast need to be supported. These different higher layer services are handled by broadcast on PHY layer. The baseline is no HARQ in PHY, but possible automatic repeat request (ARQ) support in L2. Hence, there is a need for a comprehensive concept of how to facilitate robust D2D communications (unicast, group-cast, and broadcast) on top of such broadcast based L1.

The use of a star-topology D2D cluster in which a selected device is taking a special role in coordinating and perhaps controlling possible D2D communications among cluster members is one of the approaches for supporting ProSe D2D communications. An example of how a D2D cluster may provide the broadcast based D2D communications includes the cluster head (CH) coordinating and allocating physical channel resources for cluster members to transmit for their requested individual user(s) or user group(s) within the cluster.

One of the challenges in terms of physical resource allocation is that, provided a limited physical resource pool for all D2D communications within the cluster, how can the CH coordinate to ensure efficient and fair physical resource sharing among active individual users and user groups being members of the cluster. A larger D2D communication group having more traffic demands and transmitters may require more physical resources than a smaller group. Since these factors may be dynamic, being able to monitor the presently formed user groups and their transmission/reception activities may be beneficial for efficient physical resource allocation.

Public safety (PS) use case scenarios are mission-critical group communications, which may have basic operations, for example, as follows: 1. With concurrent on-network operations, there should not be more than 6-8 D2D ProSe group communication groups at an incident scene; 2. With concurrent on-network operations, there should not be more than 12-16 users assigned to each D2D ProSe group communication group but the group size could be expanded to 50-70 users to accommodate a search and rescue team and could be reduced to 2 to form an authorized "private call" between two members of a given group; and 3. Geographic area of operations for D2D ProSe group communication could be up to 1.5 mile radius per incident scene.

Thus, there can be multiple user groups present at an incident scene (service area or location of interest) and all need to be able to communicate in an effective and reassuring fashion. Each group should therefore have some physical channel resources allocated to it in a semi-persistent way to ensure at least basic need of communications but all the groups may operate in a first-come first-serve yet fair fashion in term of sharing the common physical resource pool, taking into priorities of different users, user groups, applications and services. Here, efficient and fair physical resource sharing among the present user groups is a primary issue, not congestion or overload prevention. As an example, assuming that the total physical channel resource pool for D2D group communications of interest consists of 10 channels. The first user group (e.g., fire-fighters) present at the site may have, for instance, 20 members and be granted to use 5 channels. This is acceptable until a second group (e.g., police), a third group (e.g., medical), and more user groups arrive in the scene. Each of these groups may have at least one channel allocated to it and, depending on the number of users in each group and communication needs thereof, may have some more channels allocated. In some cases, the first user group may not be allowed to ask for more physical channel resources or even have to give up one or two channels for other groups, at least for some certain period of time.

Certain embodiments of the invention therefore address fairness issues in physical resource allocation for broadcast based D2D group communications, such as D2D cluster based 1:M broadcast based group communications. Some embodiments assume a system where a channel is assigned by CH on request of a transmitting (Tx) user equipment (UE) member which discloses its Tx UE ID and intended receiving (Rx) UE ID(s) or Group ID(s) as well. Hence, CH actually has good knowledge about physical resources allocated to individual UEs as well as user groups thereof. Thus, without the need for sophisticated control, CH is able to coordinate physical resource allocation (RA) among UEs and their individual user groups in a fair and efficient manner. Accordingly, certain embodiments provide a method including mechanisms to deal with "greedy" user(s) or user group(s) to ensure a fair and efficient RA.

FIG. 1 illustrates a simplified example of a communication system 100, in accordance with one embodiment. In this example, system 100 includes one eNB, eNB1, and six UEs (UE1-UE6). However, as one of ordinary skill would readily appreciate, system 100 can include any number of eNBs and/or UEs. In this example, eNB1 can serve the UEs within its serving area including, for example, UE1-UE6. Therefore, in some embodiments, UE1-UE6 may be served by the cellular network infrastructure via eNB1. Additionally, in this example, UE1, UE2 and UE3 may be in D2D communication, while UE4, UE5 and UE6 may be in D2D communication. Thus, in one embodiment, UE1, UE2 and UE3 may form a user group, and UE4, UE5 and UE6 may form another user group. Of course, as discussed above, additional UEs may be included in each of the user groups and the number of users in a user group is not necessarily limited to this example. According to certain embodiments, any one of UE1, UE2, UE3, UE4, UE5, and/or UE6 may serve as a cluster head (CH). The other UEs that are not serving as the CH may be considered cluster members.

As an example, the UEs in FIG. 1 may be forming a cluster in which, for example, UE5 is acting as the CH and the remaining UEs are cluster members. Both of the communicating user groups (i.e., UE1-UE3 and UE4-UE6) may be under coordination/control of the CH. The control signalling between the CH and UE members, however, is not depicted in FIG. 1. FIG. 1 illustrates an in-network-coverage scenario. D2D cluster and group communications in out-of-network-coverage scenarios or, in more general, autonomous D2D communications, are supported.

Embodiments of the invention enable the CH to deal with "greedy" cluster member(s) and/or user group(s) thereof so as to ensure a fair and efficient RA. In one embodiment, the CH may monitor the transmission/reception activities and physical resource usage among local active users (e.g., members of some user groups) and user groups thereof, taking into account priorities and requirements of users, user groups, applications and services:

According to an embodiment, based on the monitoring, the CH may issue an explicit indication in the pre-defined D2D broadcast control channel of CH prohibiting further requests to expand physical channel resources allocated to an active user group from users of the active user group. The active user group may be identified in the explicit indication. In an embodiment, the prohibition of further requests to expand physical channel resources may be valid for a certain period of time or until further notice, counted from the instance the explicit indication is transmitted or from an offset thereto. In an alternative embodiment, the explicit indication may indicate that such requests will be denied for the certain period of time as indicated or until further notice.

In another embodiment, the CH may issue a warning message to a certain active user group identified in the warning message that the CH intends to free up (or reclaim) a certain amount of allocated physical channel resources from the group starting from an indicated time instance. For example, the CH, starting from the indicated time instance, may proactively select to reclaim some of the allocated physical channel resources from the targeted user group by indicating those selected physical channel resources as free physical resources or taking those away from the indicated channel occupancy information related to the targeted user group in the updated broadcast control information. It is noted that from the instance the warning message is transmitted to the instance indicated in the warning message as the expected starting time instance, the CH may monitor possible channel release requests from active users of the targeted user group and select the physical channel resources to reclaim according to those requests. The warning message may implicitly or explicitly include the indication of prohibition or denial of expanded physical channel resource requests from the identified group, as previously discussed. In one embodiment, the warning is valid until the period of time of the indication of prohibition or denial of expanded physical channel resource request from the identified group expires or until the physical channel resources have been adjusted as indicated in the warning or until the earliest occurrence of either.

In yet another embodiment, the CH may issue an explicit or implicit indication, where the implicit indication may be implicitly realized along with the above-discussed embodiments that certain allocated physical channel resources of the user group can now be used in a certain predefined intra-group channel sharing operation mode (e.g., some contention based access or token based access) for the user group. In the implicit indication option, all the allocated physical resources of the user group may be used by members of the user group in a certain predefined intra-group channel sharing operation mode (e.g., some contention based access or token based access).

In some embodiments, the CH may monitor activities of allocated channel(s) specific to a selected active user or user group and reclaim it based on monitored result. For instance, if CH receives L consecutive dummy packets which are sent on the allocated channel by the corresponding transmitter every predefined T interval when having no other data to transmit, as specified for inactivity period of the channel holding time, then the CH may free up that channel. The selection may be based on fairness in physical resource sharing (among potential greedy users or user groups) or based on report from receiving users of certain allocated physical channel resources. The monitoring (e.g., L and T parameters) and decision of the CH may also take into account service priority, group priority, user priority, etc., and any possible combinations thereof, as preconfigured to all relevant user devices including CH and/or indicated by cluster members.

According to one embodiment, cluster member UEs may be configured to monitor up-to-date control information from CH sent on the D2D broadcast control channel of the CH and react accordingly. Hence, behaviors and actions of cluster member UEs in the user groups indicated or warned by CH, as described above, correspond to the CH control signaling discussed above. Further, in an embodiment, a cluster member UE of user group(s) other than that indicated or warned by CH as discussed above may also monitor the indication or warning messages, for example, to make an informed or smart decision as to when to try (or retry) requesting for physical resources. In certain embodiments, a UE member of the cluster (regardless of user groups), which has a dedicated physical channel resource allocated to it, may be configured to monitor and proactively request releasing the allocated physical channel resource if it has no data to send for a certain preconfigured period of time which can be specific to service priority, group priority, user priority, etc., and any possible combinations thereof.

Figure 2:
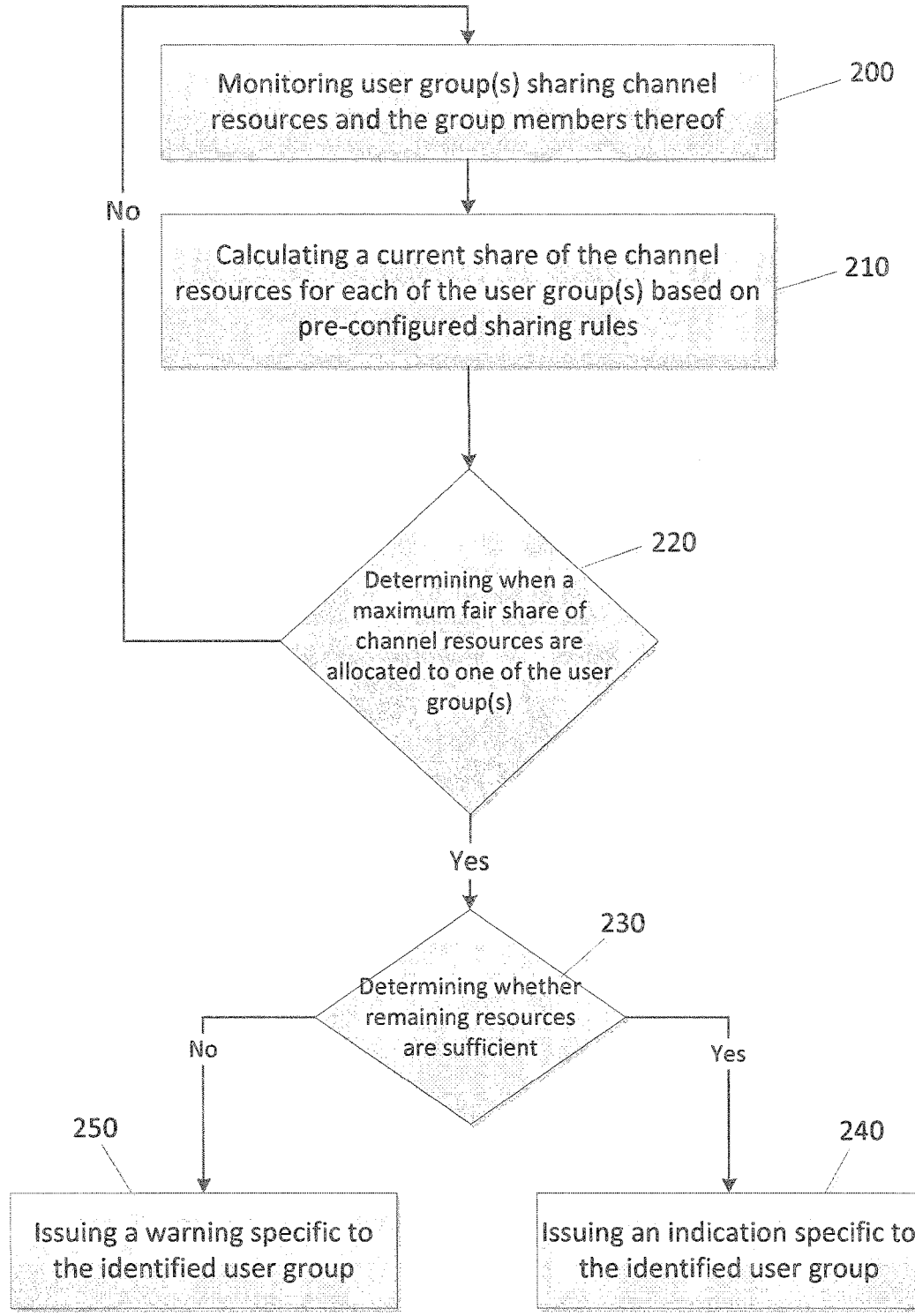
FIG. 2 illustrates a flow diagram of a method according to an embodiment.

FIG. 2 illustrates an example of a flow diagram of a method for handling "greedy" user(s) or user group(s) in broadcast based D2D communication, according to one embodiment. In an embodiment, the method may be performed by a network entity, such as a CH. The method includes, at 200, monitoring the presence of different active user group(s) sharing local/physical channel resources. The monitoring of the user group(s) may include monitoring active group members, transmission activities, user and service contexts thereof, including allocated physical channel resources and channel holding time intervals, priorities related to active user groups, active group members and services, etc.

The method may further include, at 210, determining or calculating the current share of local/physical channel resources for each of the user group(s) based on, for example, pre-configured fair-sharing rules (e.g., thresholds and/or functions of monitored outputs). The method may then include, at 220, determining when one or more of the user group(s) is having a maximum fair share of physical channel resources allocated to it. If it is determined that there is not a user group allocated its maximum fair share of physical resources, then the method may return to 200. If it is determined that there is a user group allocated its maximum fair share of physical resources, then the method may include, at 230, determining if the remaining physical resources are sufficient to support each of the user group(s).

If it is determined that the remaining physical resources are sufficient, then the method may include, at 240, issuing an indication specific to the user group identified as having the maximum share of physical resources allocated it. As mentioned above, in one embodiment, the indication may be an explicit indication in the pre-defined D2D broadcast control channel of CH prohibiting further requests to expand physical channel resources allocated to an active user group from users of the active user group.

In one embodiment, the maximum fair share of physical resource pool may be a pre-configured threshold such as a certain percentage of the current total physical channel resources or at least one a user group may be allocated, regardless of how many different present user groups there are or traffic demands of the user group. In another embodiment, the maximum fair share of physical resource pool may also be an on-the-fly updated quantity depending on relative physical resource sharing among different user groups, existing as well as expectable new ones for a robust operation. As a non-limiting example, if there is just a single present active user group then the user group may be allowed to use up to, for example, 80% of physical channel resources. As another example, if there are two active user groups conducting voice group calls where one has 20 members and the other has 10 members, the first one may be allowed to use up to 50% of physical channel resources and the other up to 25%. The remaining 20% may be reserved for start-up new user group(s), ensuring a robust and reliable operation for PS usage.

Returning to FIG. 2, if it is determined that the remaining physical resources are not sufficient, then the method may include, at 250, issuing a warning specific to the user group identified as having the maximum share of physical resources allocated it. As mentioned above, the warning may be a warning message to the identified user group that the CH intends to free up (or reclaim) a certain amount of allocated physical channel resources from the group starting, for example, from an indicated time instance.

Because of high reliability requirements for PS usage, sudden changes of allocated physical channel resources to a user group may cause data losses or transmission delays or even service interruption affecting on-going service or quality of service (QoS) thereof. Hence, the warning message described herein, which may allow sufficient time for relevant user groups (the warned user group as well as those which are in need for some physical resources of the warned user group in the fair sharing fashion) to prepare or adapt, is rather preferable for PS services. The warning may contain a relative or absolute indication of amount of physical resources intended to be reclaimed compared to the amount allocated at the time of the warning. In another embodiment, the warning may include an indication of the maximum (and/or minimum) amount of physical resources intended to be reclaimed. The warning may be further enhanced with possible overriding or deactivation of the current warning before the indicated time instant it takes effect. For instance, if CH determines that the issued warning is no longer valid early enough (which may be implemented with a false-alarm timer) before the indicated time instant then CH may issue a message to cancel or modify the current warning.

In some embodiments, the functionality of any of the methods described herein, such as that illustrated in FIG. 2 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software. In another embodiment, an apparatus is disclosed comprising means to perform any of the described methods.

Figure 3A:
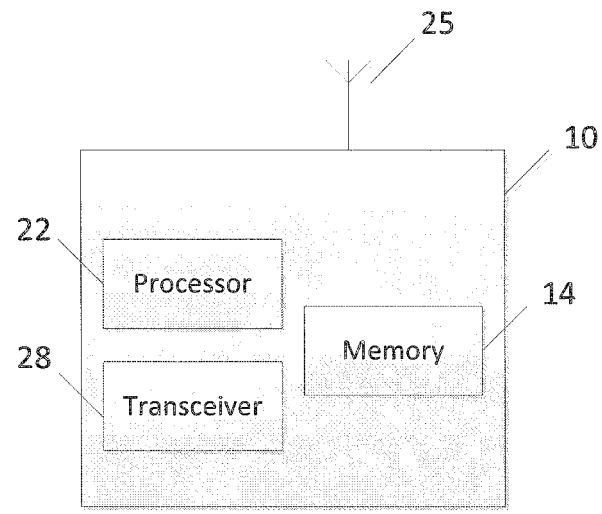
FIG. 3a illustrates an example of an apparatus according to an embodiment.

FIG. 3a illustrates an example of an apparatus 10 according to an embodiment. In one embodiment, apparatus 10 may be a network node, such as a CH. For instance, apparatus 10 may be a D2D UE as illustrated in FIG. 1 discussed above. However, it should be understood that apparatus 10 may take other forms and the device illustrated in FIG. 1 is merely one example. Further, it should be noted that one of ordinary skill in the art would understand that apparatus 10 may include components or features not shown in FIG. 3a. Only those components or features necessary for illustration of the invention are depicted in FIG. 3a.

As illustrated in FIG. 3a, apparatus 10 includes a processor 22 for processing information and executing instructions or operations. Processor 22 may be any type of general or specific purpose processor. While a single processor 22 is shown in FIG. 3a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 may be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to one embodiment, apparatus 10 may be a network node, such as a CH. In this embodiment, apparatus 10 may be controlled by memory 14 and processor 22 to monitor at least one user group sharing physical channel resources. The at least one user group may include one or more D2D UEs. The monitoring of the at least one user group may further include monitoring group members of the at least one user group, transmission activities of the at least one user group, user and service contexts thereof, allocated physical channel resources and channel holding time intervals, and priorities related to the at least one user group, the group members, and services.

Apparatus 10 may then be controlled by memory 14 and processor 22 to calculate a current share of the physical channel resources for the at least one user group based on pre-configured fair sharing rules. In an embodiment, the pre-configured fair sharing rules may include at least one of thresholds or functions of monitored outputs of the at least one user group. Apparatus 10 may further be controlled to determine when a maximum fair share of the physical channel resources are allocated to one of the at least one user group and determine whether remaining physical resources are sufficient. According to one embodiment, the maximum fair share of the physical channel resources may include a pre-configured threshold comprising a certain percentage of total physical channel resources the at least one user group may be allocated. According to another embodiment, the maximum fair share of the physical channel resources comprises an on-the-fly updated quantity depending on relative physical resource sharing among the user groups.

When the remaining physical resources are sufficient, apparatus 10 may then be controlled by memory 14 and processor 22 to issue an indication to the one of the at least one user group. In one embodiment, the issuing of the indication may include issuing an explicit indication on a D2D broadcast control channel of the apparatus prohibiting further requests to expand the physical channel resources allocated to the one of the at least one user group. In another embodiment, the issuing of the indication may include issuing an implicit indication that all allocated physical resources of the one of the at least one user group should be used by members of the at least one user group in a certain predefined intra-group channel sharing operation mode.

When the remaining physical resources are not sufficient, apparatus 10 may then be controlled by memory 14 and processor 22 to issue a warning to the one of the at least one user group. According to one embodiment, the issuing of the warning may include issuing a warning message to the one of the at least one user group that the apparatus intends to free up a certain amount of allocated physical channel resources from the one of the at least one user group beginning at an indicated time instance.

Figure 3B:
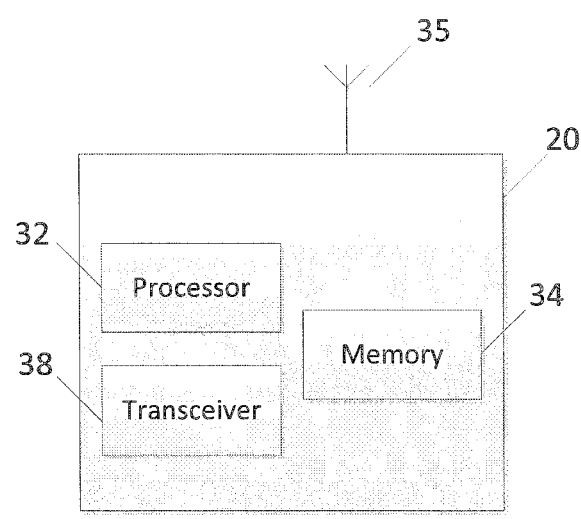
FIG. 3b illustrates an example of an apparatus according to another embodiment.

FIG. 3b illustrates an example of an apparatus 20 according to another embodiment. In an embodiment, apparatus 20 may be cluster member, for example a D2D user equipment in a communications network, such as the UEs illustrated in FIG. 1 discussed above. It should be noted that one of ordinary skill in the art would understand that apparatus 20 may include components or features not shown in FIG. 3b. Only those components or features necessary for illustration of the invention are depicted in FIG. 3b.

As illustrated in FIG. 3b, apparatus 20 includes a processor 32 for a processing information and executing instructions or operations. Processor 32 may be any type of general or specific purpose processor. While a single processor 32 is shown in FIG. 3b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 may be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a cluster member, such as the D2D UEs discussed above. In this embodiment, apparatus 20 may be controlled by memory 34 and processor 32 to monitor control information for an indication or a warning message, and to make a decision of when to attempt to request physical resources based on the monitored control information. The control information may be transmitted by a cluster head on D2D broadcast channel Apparatus 20 may be further controlled by memory 34 and processor 32 to request release of an allocated control channel resource when the apparatus has no data to send for a certain pre-configured period of time.

In view of the above, embodiments of the invention may provide several advantages. For example, some advantages may include efficient coordination of fair physical resource sharing among active D2D user groups.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
monitoring, by a cluster head, at least one user group sharing physical channel resources, wherein the at least one user group comprises at least one D2D user equipment;
calculating a current share of the physical channel resources allocated to the at least one user group based on pre-configured fair sharing rules;
determining when a maximum fair share of the physical channel resources are allocated to one of the at least one user group;
determining whether remaining physical resources are sufficient;
when the remaining physical resources are sufficient, issuing an indication to the one of the at least one user group;
when the remaining physical resources are not sufficient, issuing a warning to the one of the at least one user group excluding the cluster head,
wherein the issuing of the warning comprises issuing a warning message to the one of the at least one user group that the cluster head intends to free up a certain amount of allocated physical channel resources from the one of the at least one user group that is actively using the certain amount of allocated physical channel resources.

2. The method according to claim 1, wherein the monitoring comprises monitoring group members of the at least one user group, transmission activities of the at least one user group, user and service contexts thereof, allocated physical channel resources and channel holding time intervals, and priorities related to the at least one user group, the group members, and services.

3. The method according to claim 1, wherein the pre-configured fair sharing rules comprises at least one of thresholds or functions of monitored outputs of the at least one user group.

4. The method according to claim 1, wherein the maximum fair share of the physical channel resources comprises a pre-configured threshold comprising a certain percentage of total physical channel resources the at least one user group may be allocated.

5. The method according to claim 1, wherein the maximum fair share of the physical channel resources comprises an on-the-fly updated quantity depending on relative physical resource sharing among the user groups.

6. The method according to claim 1, wherein the issuing of the indication comprises issuing an explicit indication on a D2D broadcast control channel of the cluster head prohibiting further requests to expand the physical channel resources allocated to the one of the at least one user group.

7. The method according to claim 1, wherein the issuing of the indication comprises issuing an implicit indication that all allocated physical resources of the one of the at least one user group should be used by members of the at least one user group in a certain predefined intra-group channel sharing operation mode.

8. The method according to claim 1, wherein the certain amount of allocated physical channel resources are freed from the one of the at least one user group beginning at an indicated time instance.

9. An apparatus, comprising:
at least one processor; and
at least one memory comprising computer program code, the at least one memory and the computer program code configured, with the at least one processor, to cause the apparatus at least to
monitor at least one user group sharing physical channel resources, wherein the at least one user group comprises at least one D2D user equipment;
calculate a current share of the physical channel resources allocated to the at least one user group based on pre-configured fair sharing rules;
determine when a maximum fair share of the physical channel resources are allocated to one of the at least one user group;
determine whether remaining physical resources are sufficient;
when the remaining physical resources are sufficient, issue an indication to the one of the at least one user group;
when the remaining physical resources are not sufficient, issue a warning to the one of the at least one user group excluding a cluster head; and
issue the warning by issuing a warning message to the one of the at least one user group that the cluster head intends to free up a certain amount of allocated physical channel resources from the one of the at least one user group that is actively using the certain amount of allocated physical channel resources.

10. The apparatus according to claim 9, wherein the at least one memory and the computer program code are further configured, with the at least one processor, to cause the apparatus at least to monitor group members of the at least one user group, transmission activities of the at least one user group, user and service contexts thereof, allocated physical channel resources and channel holding time intervals, and priorities related to the at least one user group, the group members, and services.

11. The apparatus according to claim 9, wherein the pre-configured fair sharing rules comprises at least one of thresholds or functions of monitored outputs of the at least one user group.

12. The apparatus according to claim 9, wherein the maximum fair share of the physical channel resources comprises a pre-configured threshold comprising a certain percentage of total physical channel resources the at least one user group may be allocated.

13. The apparatus according to claim 9, wherein the maximum fair share of the physical channel resources comprises an on-the-fly updated quantity depending on relative physical resource sharing among the user groups.

14. The apparatus according to claim 9, wherein the at least one memory and the computer program code are further configured, with the at least one processor, to cause the apparatus at least to issue the indication by issuing an explicit indication on a D2D broadcast control channel of the apparatus prohibiting further requests to expand the physical channel resources allocated to the one of the at least one user group.

15. The apparatus according to claim 9, wherein the at least one memory and the computer program code are further configured, with the at least one processor, to cause the apparatus at least to issue the indication by issuing an implicit indication that all allocated physical resources of the one of the at least one user group should be used by members of the at least one user group in a certain predefined intra-group channel sharing operation mode.

16. The apparatus according to claim 9, wherein the certain amount of allocated physical channel resources are freed from the one of the at least one user group beginning at an indicated time instance.

17. The apparatus according to claim 9, wherein the apparatus comprises a cluster head.

18. An apparatus, comprising:
at least one processor; and
at least one memory comprising computer program code, the at least one memory and the computer program code configured, with the at least one processor, to cause the apparatus at least to
monitor control information for an indication or a warning message which indicates that remaining physical resources are not sufficient, wherein the control information is received from a cluster head on a device-to-device (D2D) broadcast channel; and
make a decision of when to attempt to request physical resources based on the monitored control information, wherein the warning message indicates that the cluster head intends to free up a certain amount of allocated physical channel resources from at least one cluster member user equipment that is actively using the certain amount of allocated physical channel resources.

19. The apparatus according to claim 18, wherein the at least one memory and the computer program code are further configured, with the at least one processor, to cause the apparatus at least to request release of an allocated physical channel resource when the apparatus has no data to send for a certain pre-configured period of time determined according to the monitored control information.

* * * * *